United States Patent
Asal et al.

(10) Patent No.: US 7,673,119 B2
(45) Date of Patent: Mar. 2, 2010

(54) VLIW OPTIONAL FETCH PACKET HEADER EXTENDS INSTRUCTION SET SPACE

(75) Inventors: Michael D. Asal, Austin, TX (US); Eric J. Stotzer, Houston, TX (US); Todd T. Hahn, Sugarland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 296 days.

(21) Appl. No.: 11/382,134

(22) Filed: May 8, 2006

(65) Prior Publication Data

US 2006/0259739 A1   Nov. 16, 2006

Related U.S. Application Data

(60) Provisional application No. 60/680,666, filed on May 13, 2005.

(51) Int. Cl.
*G06F 9/30* (2006.01)
*G06F 15/76* (2006.01)

(52) U.S. Cl. .......................................... 712/206; 712/24
(58) Field of Classification Search .................... 712/24
See application file for complete search history.

(56) References Cited

U.S. PATENT DOCUMENTS

| | | | | |
|---|---|---|---|---|
| 5,638,525 A | * | 6/1997 | Hammond et al. | 712/209 |
| 6,081,884 A | * | 6/2000 | Miller | 712/204 |
| 6,366,998 B1 | * | 4/2002 | Mohamed | 712/17 |
| 6,499,096 B1 | * | 12/2002 | Suzuki | 712/24 |
| 6,615,339 B1 | * | 9/2003 | Ito et al. | 712/24 |
| 6,658,551 B1 | * | 12/2003 | Berenbaum et al. | 712/24 |
| 6,684,320 B2 | * | 1/2004 | Mohamed et al. | 712/24 |
| 6,859,870 B1 | * | 2/2005 | Kim et al. | 712/24 |
| 6,892,293 B2 | * | 5/2005 | Sachs et al. | 712/215 |
| 7,136,989 B2 | * | 11/2006 | Ishii | 712/23 |

* cited by examiner

*Primary Examiner*—Eddie P Chan
*Assistant Examiner*—Jacob Petranek
(74) *Attorney, Agent, or Firm*—Robert D. Marshall, Jr.; Wade J. Brady, III; Frederick J. Telecky, Jr.

(57) ABSTRACT

This invention is useful in a very long instruction word data processor that fetches a predetermined plural number of instructions each operation cycle. A predetermined one of these instructions is used as a special header. This special header has a unique encoding different from any normal instruction. When decoded this special header instructs decode hardware to decode this fetch packet in a special way. In one embodiment a bit field in the header signals the decode hardware whether to decode each instruction word normally or in an alternative way. The header may include extension opcode bits corresponding to each of the other instruction slots. In another embodiment another bit field signals whether to decode an instruction field as one normal length instruction or as two half-length instructions.

24 Claims, 5 Drawing Sheets

(1) L1I CACHE MISS FILL FROM L2
(2) L1D CACHE MISS FILL FROM L2
(3) L1D WRITE MISS TO L2, OR L1D VICTIM TO L2, OR L1D SNOOP RESPONSE TO L2
(4) L2 CACHE MISS FILL, OR DMA INTO L2
(5) L2 VICTIM WRITE BACK, OR DMA OUT OF L2
(6) DMA INTO L2
(7) DMA OUT OF L2

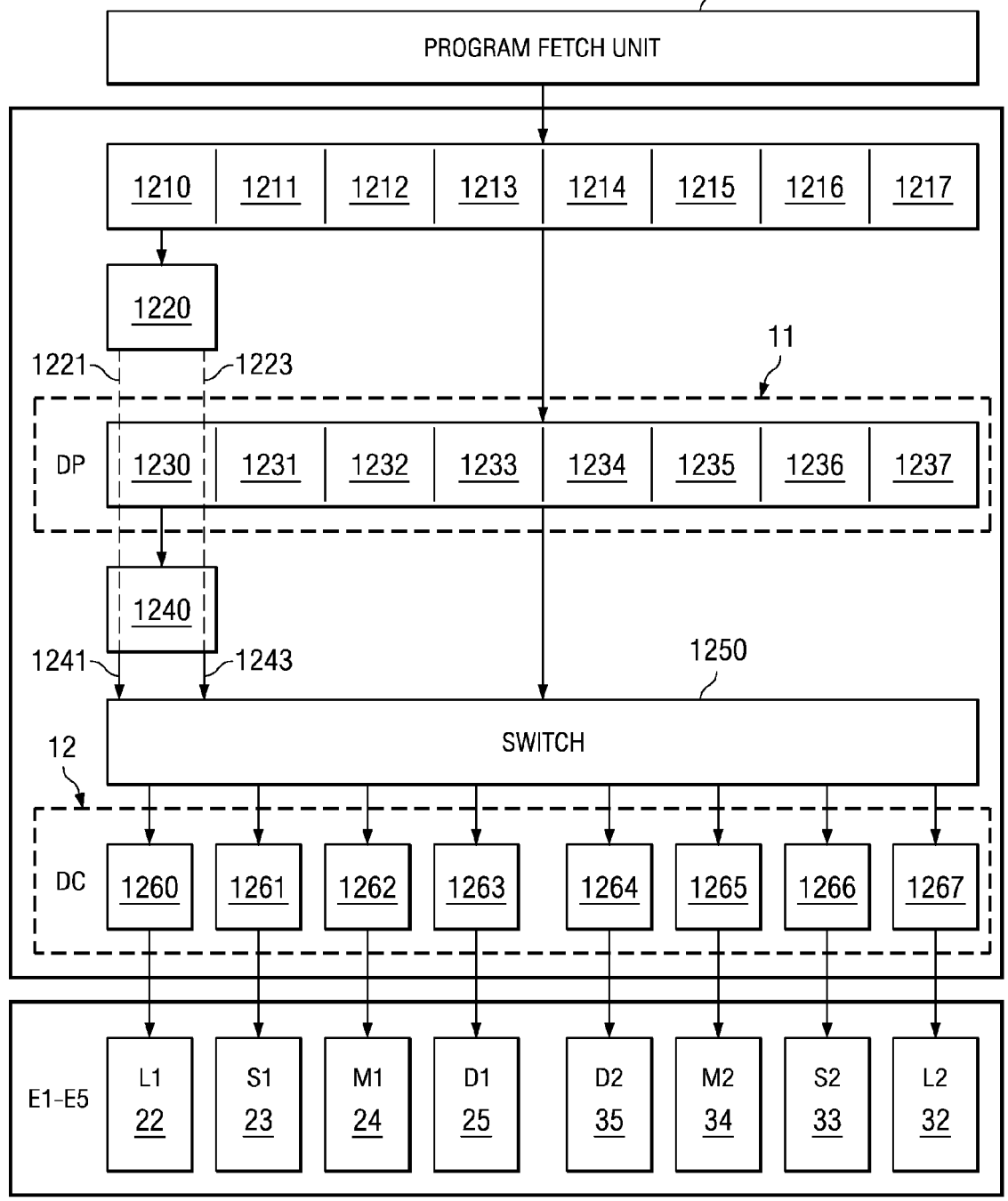

VLIW OPTIONAL FETCH PACKET HEADER EXTENDS INSTRUCTION SET SPACE

CLAIM OF PRIORITY

This application claims priority under 35 U.S.C. 119(e)(1) to U.S. Provisional Application No. 60/680,666 filed May 13, 2005.

TECHNICAL FIELD OF THE INVENTION

The technical field of this invention is instruction specification in instructions for data processing systems.

BACKGROUND OF THE INVENTION

Designers are constantly striving to improve programmable data processors such as microprocessors and digital signal processors. Often desired improvements involve making the programmable data processor capable of executing additional data processing functions. Such additional data processing functions can be achieved by proposing a new programmable data processor with a new instruction set architecture defining processor operations. However, it is considered desirable to code such new instructions within the same instruction word length of a prior programmable data processor. This permits users, customers of the original data processor vendor, to re-use their prior investment in programming tools and system designer expertise in using the new functions. Such an upgrade of an existing instruction set architecture merely requires an incremental change by the customer. An entirely new data processor with a new instruction set architecture would require a radical change by the customer.

A known manner to address this problem is to change an instruction decoder to detect the desired additional functions and to control operation of a functional unit to achieve the function. One problem with this approach is the limitation of opcode space. Opcode space is the theoretical space defined by the bits of an instruction word available for instruction definition. Not all bits of an instruction word are available for instruction definition. It is conventional to use some instruction bits to define two data registers for source operands and a further instruction bits to define a destination instruction registers. It is common for programmable data processors to have 32 such data registers. Thus $3 \times \log_2 32$ or 15 instruction word bits are needed just to specify data registers. Other instruction word bits are commonly used for additional signaling and control functions. With many programmable data processors employing 32-bit instruction words, bits that can be devoted to opcodes are limited. In many known data processors few unallocated opcodes exist.

Another problem faced by designers of programmable data processors is known as code bloat. With instruction lengths generally set at 32 bits, the amount of memory required to store instructions may be very large. It is known that many commonly used instructions could be coded with fewer bits, such as 16 bits because these instructions do not need to specify three data registers or because all possible signaling and control functions are not relevant and need not be coded. In many useful product applications at least a significant portion of the system program could be specified with instruction words shorter than the standard length. The designer is left with the problem of distinguishing between this shorter instruction word code and the normal length instruction word code.

A known solution to these two problems involves data processor modes. The data processor has a normal mode which operates in the same manner as the prior data processor in the same family. An alternative mode enables access to alternate or extended instructions by redefining how the limited opcodes are decoded. These alternate or extended instructions could include smaller length instructions or instructions not present in the original instruction set. Generally such data processor modes are invoked by a mode instruction in each mode. A normal mode instruction when executed switches the data processor to the alternative mode. An alternative mode instruction when executed switches the data processor to the normal mode.

Such data processor modes achieve their purpose of enabling the extended or alternative instructions but introduce additional problems. Tracking the current data processor mode and insuring that the instructions to be executed are appropriate for the current mode is a problem. Often there is a significant overhead in changing modes. This prevents free mixing of normal mode and extended mode instructions. In the case of normal length alternative or extended instructions mode changes can be reduced by providing commonly used instructions in both modes. This may reduce the number of required mode changes but takes up limited opcode space in both modes. When implementing a smaller length instruction set, only commonly used instructions are encoded because of limited opcode space. Thus data processor modes are not a completely satisfactory solution to this problem.

SUMMARY OF THE INVENTION

This invention is useful in a very long instruction word data processor that fetches a predetermined plural number of instructions each operation cycle. A predetermined one of these instructions is used as a special header. This special header has a unique encoding different from any normal instruction. When decoded this special header instructs decode hardware to decode this fetch packet in a special way. In one embodiment a bit field in the header signals the decode hardware whether to decode each instruction word normally or in an alternative way. The header may include extension opcode bits corresponding to each of the other instruction slots. In another embodiment another bit field signals whether to decode an instruction field as one normal length instruction or as two half-length instructions.

BRIEF DESCRIPTION OF THE DRAWINGS

These and other aspects of this invention are illustrated in the drawings, in which:

FIG. 12 illustrates exemplary decoding hardware enabling the very long instruction word digital signal processor core illustrated in FIG. 2 to practice this invention.

DETAILED DESCRIPTION OF PREFERRED EMBODIMENTS

A preferred embodiment of this invention will be described in this section. This invention is not limited to the preferred embodiment. It would be a straightforward task for one skilled in the art to apply the invention to a larger class of data processing architectures that employ plural instruction fetch packets. This description corresponds to the Texas Instruments TMS32006400 digital signal processor.

Figure 1:
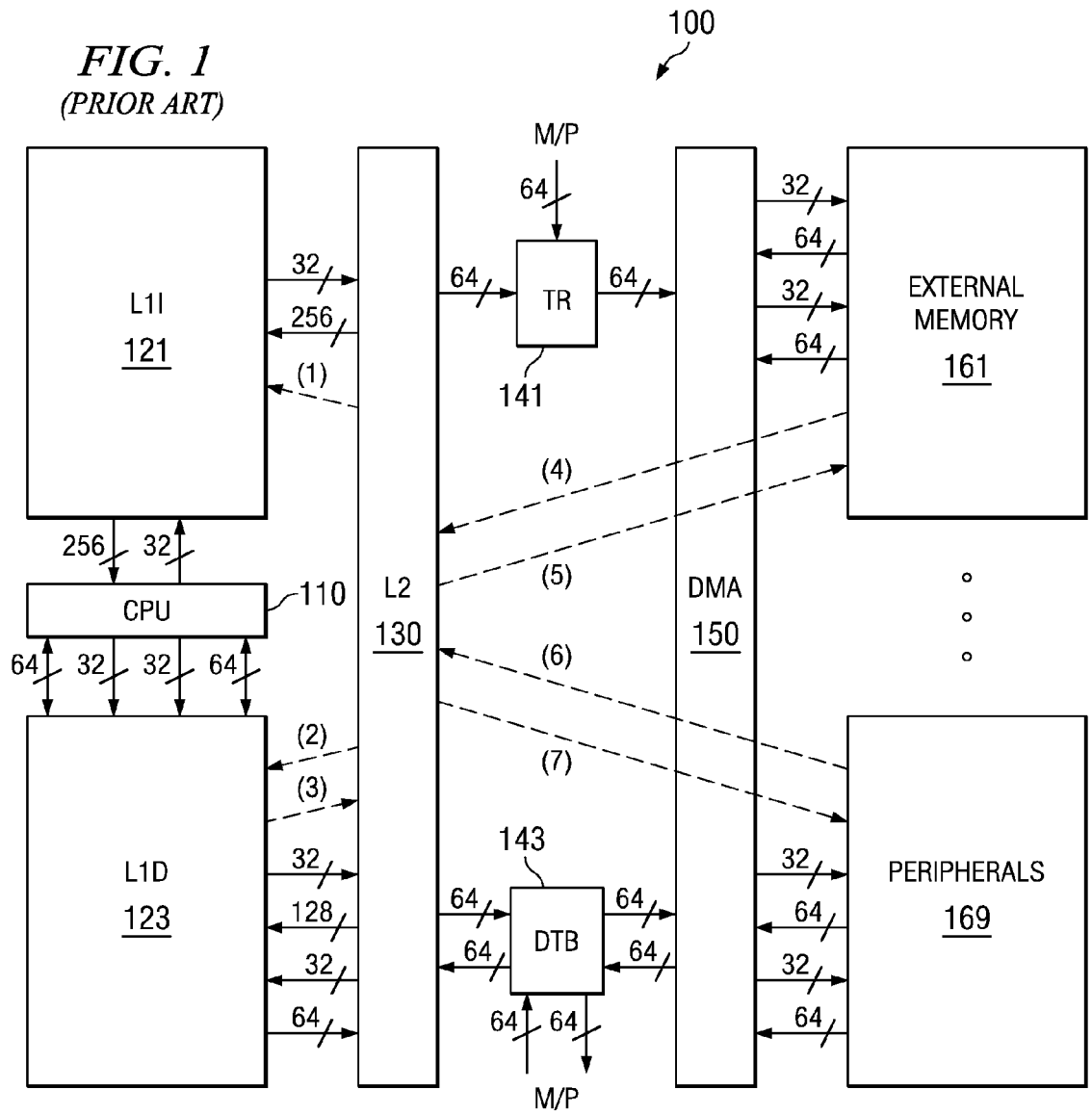
FIG. 1 illustrates the organization of a typical digital signal processor to which this invention is applicable (prior art)

FIG. 1 illustrates the organization of a typical digital signal processor system 100 to which this invention is applicable (prior art). Digital signal processor system 100 includes central processing unit core 110. Central processing unit core 110 includes the data processing portion of digital signal processor system 100. Central processing unit core 110 could be constructed as known in the art and would typically includes a register file, an integer arithmetic logic unit, an integer multiplier and program flow control units. An example of an appropriate central processing unit core is described below in conjunction with FIGS. 2 to 4.

Digital signal processor system 100 includes a number of cache memories. FIG. 1 illustrates a pair of first level caches. Level one instruction cache (L1I) 121 stores instructions used by central processing unit core 110. Central processing unit core 110 first attempts to access any instruction from level one instruction cache 121. Level one data cache (L1D) 123 stores data used by central processing unit core 110. Central processing unit core 110 first attempts to access any required data from level one data cache 123. The two level one caches are backed by a level two unified cache (L2) 130. In the event of a cache miss to level one instruction cache 121 or to level one data cache 123, the requested instruction or data is sought from level two unified cache 130. If the requested instruction or data is stored in level two unified cache 130, then it is supplied to the requesting level one cache for supply to central processing unit core 110. As is known in the art, the requested instruction or data may be simultaneously supplied to both the requesting cache and central processing unit core 110 to speed use.

Level two unified cache 130 is further coupled to higher level memory systems. Digital signal processor system 100 may be a part of a multiprocessor system. The other processors of the multiprocessor system are coupled to level two unified cache 130 via a transfer request bus 141 and a data transfer bus 143. A direct memory access unit 150 provides the connection of digital signal processor system 100 to external memory 161 and external peripherals 169.

Figure 2:
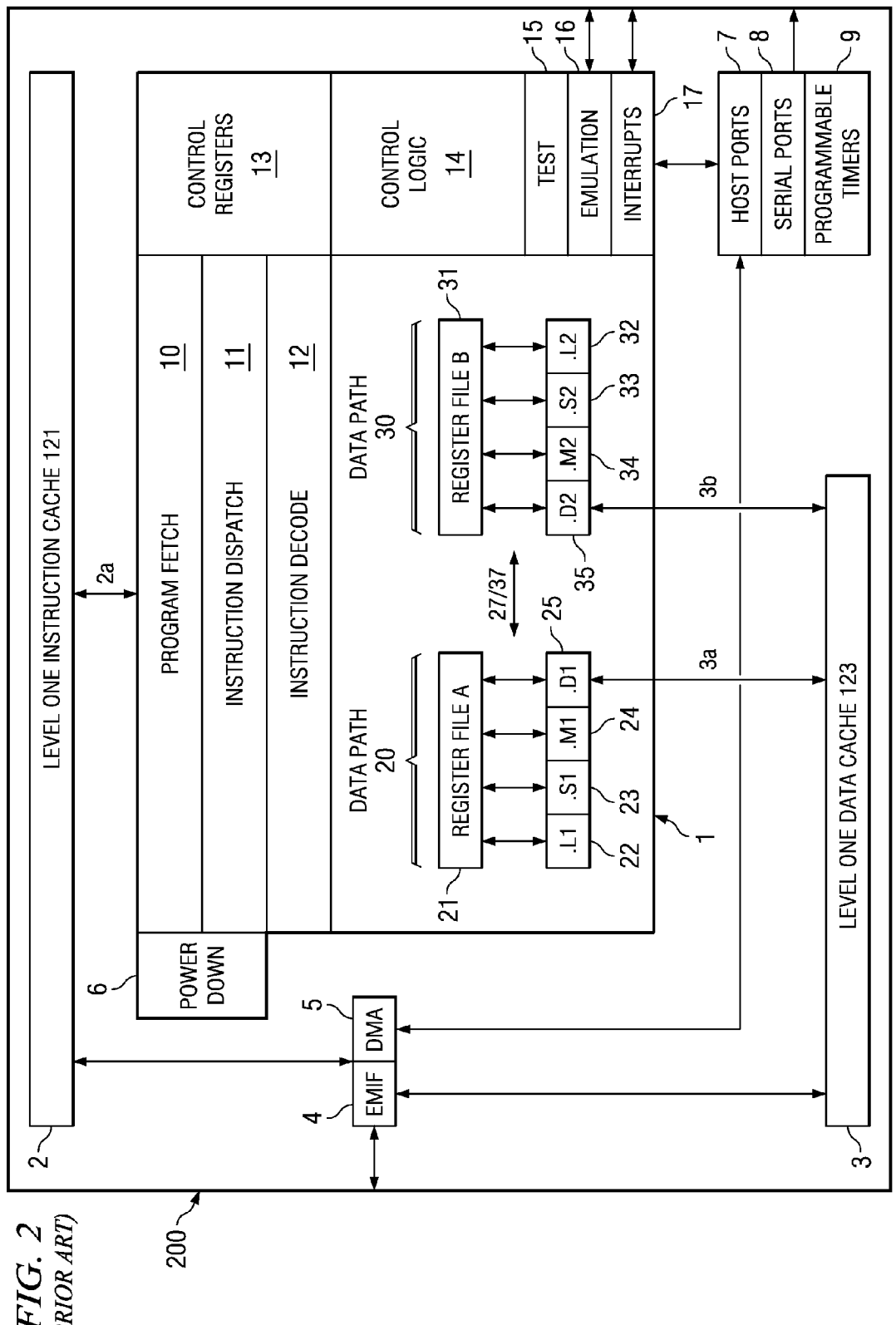
FIG. 2 illustrates details of a very long instruction word digital signal processor core suitable for use in FIG. 1 (prior art)

FIG. 2 is a block diagram illustrating details of a digital signal processor integrated circuit 200 suitable but not essential for use in this invention (prior art). The digital signal processor integrated circuit 200 includes central processing unit 1, which is a 32-bit eight-way VLIW pipelined processor. Central processing unit 1 is coupled to level 1 instruction cache 121 included in digital signal processor integrated circuit 200. Digital signal processor integrated circuit 200 also includes level one data cache 123. Digital signal processor integrated circuit 200 also includes peripherals 4 to 9. These peripherals preferably include an external memory interface (EMIF) 4 and a direct memory access (DMA) controller 5. External memory interface (EMIF) 4 preferably supports access to supports synchronous and asynchronous SRAM and synchronous DRAM. Direct memory access (DMA) controller 5 preferably provides 2-channel auto-boot loading direct memory access. These peripherals include power-down logic 6. Power-down logic 6 preferably can halt central processing unit activity, peripheral activity, and phase lock loop (PLL) clock synchronization activity to reduce power consumption. These peripherals also include host ports 7, serial ports 8 and programmable timers 9.

Central processing unit 1 has a 32-bit, byte addressable address space. Internal memory on the same integrated circuit is preferably organized in a data space including level one data cache 123 and a program space including level one instruction cache 121. When off-chip memory is used, preferably these two spaces are unified into a single memory space via the external memory interface (EMIF) 4.

Level one data cache 123 may be internally accessed by central processing unit 1 via two internal ports 3a and 3b. Each internal port 3a and 3b preferably has 32 bits of data and a 32-bit byte address reach. Level one instruction cache 121 may be internally accessed by central processing unit 1 via a single port 2a. Port 2a of level one instruction cache 121 preferably has an instruction-fetch width of 256 bits and a 30-bit word (four bytes) address, equivalent to a 32-bit byte address.

Central processing unit 1 includes program fetch unit 10, instruction dispatch unit 11, instruction decode unit 12 and two data paths 20 and 30. First data path 20 includes four functional units designated L1 unit 22, S1 unit 23, M1 unit 24 and D1 unit 25 and 16 32-bit A registers forming register file 21. Second data path 30 likewise includes four functional units designated L2 unit 32, S2 unit 33, M2 unit 34 and D2 unit 35 and 16 32-bit B registers forming register file 31. The functional units of each data path access the corresponding register file for their operands. There are two cross paths 27 and 37 permitting access to one register in the opposite register file each pipeline stage. Central processing unit 1 includes control registers 13, control logic 14, and test logic 15, emulation logic 16 and interrupt logic 17.

Program fetch unit 10, instruction dispatch unit 11 and instruction decode unit 12 recall instructions from level one instruction cache 121 and deliver up to eight 32-bit instructions to the functional units every instruction cycle. Processing occurs in each of the two data paths 20 and 30. As previously described above each data path has four corresponding functional units (L, S, M and D) and a corresponding register file containing 16 32-bit registers. Each functional unit is controlled by a 32-bit instruction. The data paths are further described below. A control register file 13 provides the means to configure and control various processor operations.

Figure 3:
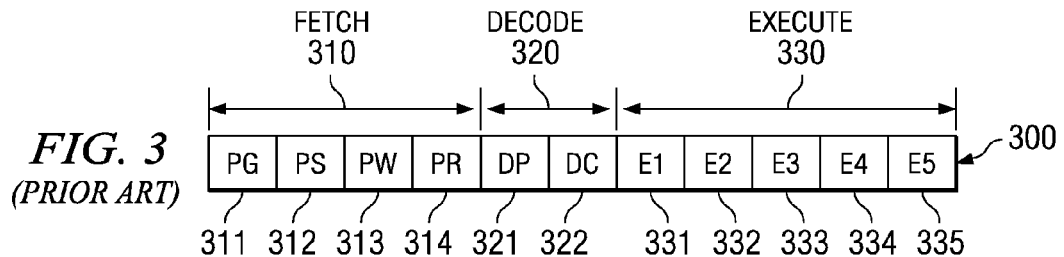
FIG. 3 illustrates the pipeline stages of the very long instruction word digital signal processor core illustrated in FIG. 2 (prior art)

FIG. 3 illustrates the pipeline stages 300 of digital signal processor core 110 (prior art). These pipeline stages are divided into three groups: fetch group 310; decode group 320; and execute group 330. All instructions in the instruction set flow through the fetch, decode, and execute stages of the pipeline. Fetch group 310 has four phases for all instructions, and decode group 320 has two phases for all instructions. Execute group 330 requires a varying number of phases depending on the type of instruction.

The fetch phases of the fetch group 310 are: Program address generate phase 311 (PG); Program address send phase 312 (PS); Program access ready wait stage 313 (PW); and Program fetch packet receive stage 314 (PR). Digital signal processor core 110 uses a fetch packet (FP) of eight instructions. All eight of the instructions proceed through fetch group 310 together. During PG phase 311, the program address is generated in program fetch unit 10. During PS phase 312, this program address is sent to memory. During PW phase 313, the memory read occurs. Finally during PR phase 314, the fetch packet is received at CPU 1.

The decode phases of decode group 320 are: Instruction dispatch (DP) 321; and Instruction decode (DC) 322. During the DP phase 321, the fetch packets are split into execute packets. Execute packets consist of one or more instructions which are coded to execute in parallel. During DP phase 322, the instructions in an execute packet are assigned to the appropriate functional units. Also during DC phase 322, the source registers, destination registers and associated paths are decoded for the execution of the instructions in the respective functional units.

The execute phases of the execute group 330 are: Execute 1 (E2) 331; Execute 2 (E2) 332; Execute 3 (E3) 333; Execute 4 (E4) 334; and Execute 5 (E5) 335. Different types of instructions require different numbers of these phases to complete. These phases of the pipeline play an important role in understanding the device state at CPU cycle boundaries.

During E1 phase 331, the conditions for the instructions are evaluated and operands are read for all instruction types. For load and store instructions, address generation is performed and address modifications are written to a register file. For branch instructions, branch fetch packet in PG phase 311 is affected. For all single-cycle instructions, the results are written to a register file. All single-cycle instructions complete during the E1 phase 331.

During the E2 phase 332, for load instructions, the address is sent to memory. For store instructions, the address and data are sent to memory. Single-cycle instructions that saturate results set the SAT bit in the control status register (CSR) if saturation occurs. For single cycle 16×16 multiply instructions, the results are written to a register file. For M unit non-multiply instructions, the results are written to a register file. All ordinary multiply unit instructions complete during E2 phase 322.

During E3 phase 333, data memory accesses are performed. Any multiply instruction that saturates results sets the SAT bit in the control status register (CSR) if saturation occurs. Store instructions complete during the E3 phase 333.

During E4 phase 334, for load instructions, data is brought to the CPU boundary. For multiply extensions instructions, the results are written to a register file. Multiply extension instructions complete during the E4 phase 334.

During E5 phase 335, load instructions write data into a register. Load instructions complete during the E5 phase 335.

Figure 4:
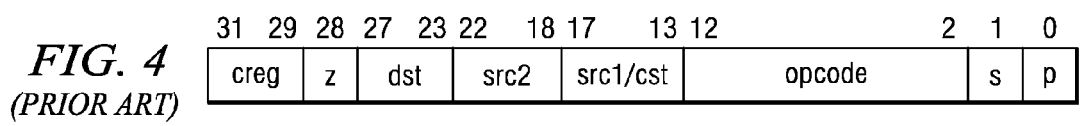
FIG. 4 illustrates the instruction syntax of the very long instruction word digital signal processor core illustrated in FIG. 2 (prior art)

FIG. 4 illustrates an example of the instruction coding of instructions used by digital signal processor core 110 (prior art). Each instruction consists of 32 bits and controls the operation of one of the eight functional units. The bit fields are defined as follows. The creg field (bits 29 to 31) is the conditional register field. These bits identify whether the instruction is conditional and identify the predicate register. The z bit (bit 28) indicates whether the predication is based upon zero or not zero in the predicate register. If z=1, the test is for equality with zero. If z=0, the test is for nonzero. The case of creg=0 and z=0 is treated as always true to allow unconditional instruction execution. The creg field is encoded in the instruction opcode as shown in Table 1.

TABLE 1

| Conditional Register | creg | | | z |
|---|---|---|---|---|
| | 31 | 30 | 29 | 28 |
| Unconditional | 0 | 0 | 0 | 0 |
| Reserved | 0 | 0 | 0 | 1 |
| B0 | 0 | 0 | 1 | z |
| B1 | 0 | 1 | 0 | z |
| B2 | 0 | 1 | 1 | z |
| A1 | 1 | 0 | 0 | z |
| A2 | 1 | 0 | 1 | z |
| A0 | 1 | 1 | 0 | z |
| Reserved | 1 | 1 | 1 | x |

Note that "z" in the z bit column refers to the zero/not zero comparison selection noted above and "x" is a don't care state. This coding can only specify a subset of the 32 registers in each register file as predicate registers. This selection was made to preserve bits in the instruction coding.

The dst field (bits 23 to 27) specifies one of the 32 registers in the corresponding register file as the destination of the instruction results.

The scr2 field (bits 18 to 22) specifies one of the 32 registers in the corresponding register file as the second source operand.

The scr1/cst field (bits 13 to 17) has several meanings depending on the instruction opcode field (bits 2 to 12). The first meaning specifies one of the 32 registers of the corresponding register file as the first operand. The second meaning is a 5-bit immediate constant. Depending on the instruction type, this is treated as an unsigned integer and zero extended to 32 bits or is treated as a signed integer and sign extended to 32 bits. Lastly, this field can specify one of the 32 registers in the opposite register file if the instruction invokes one of the register file cross paths 27 or 37.

The opcode field (bits 2 to 12) specifies the type of instruction and designates appropriate instruction options. A detailed explanation of this field is beyond the scope of this invention except for the instruction options detailed below.

The s bit (bit 1) designates the data path 20 or 30. If s=0, then data path 20 is selected. This limits the functional unit to L1 unit 22, S1 unit 23, M1 unit 24 and D1 unit 25 and the corresponding register file A 21. Similarly, s=1 selects data path 20 limiting the functional unit to L2 unit 32, S2 unit 33, M2 unit 34 and D2 unit 35 and the corresponding register file B 31.

The p bit (bit 0) marks the execute packets. The p-bit determines whether the instruction executes in parallel with the following instruction. The p-bits are scanned from lower to higher address. If p=1 for the current instruction, then the next instruction executes in parallel with the current instruction. If p=0 for the current instruction, then the next instruction executes in the cycle after the current instruction. All instructions executing in parallel constitute an execute packet. An execute packet can contain up to eight instructions. Each instruction in an execute packet must use a different functional unit.

Figure 5:
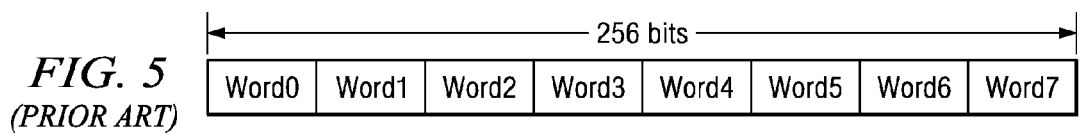
FIG. 5 illustrates one fetch packet of the very long instruction word digital signal processor core illustrated in FIG. 1 (prior art)

FIG. 5 illustrates a fetch packet of the digital signal processor integrated circuit 200 illustrated in FIG. 2. As previously described program fetch unit 10 fetches eight instructions Word0 to Word7 per operational cycle. Because each instruction Word0 to Word7 has 32 bits, the instruction fetch packet consists of 256 bits. In the preferred embodiment, each fetch packet begins at a 256 bit boundary, that is the byte address ends in "00000" (five zeros). This alignment also automatically aligns each instruction Word0 to Word7 on 32 bit boundaries.

Figure 6:
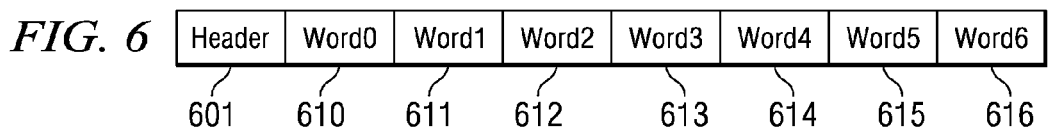
FIG. 6 illustrates one fetch packet of the very long instruction word digital signal processor core according to this invention.

FIG. 6 illustrates an exemplary fetch packet of this invention. This fetch packet consists of header 601 and seven instruction words Word0 610, Word1 611, Word2 612, Word3 613, Word4 614, Word5 615 and Word6 616. In the preferred embodiment header 601 occupies a predetermined location within the fetch packet. The example FIG. 6 illustrates this predetermined location as the most significant bits. The seven instruction words Word0 610, Word1 611, Word2 612, Word3 613, Word4 614, Word5 615 and Word6 616 occupy the other instruction word slots within the fetch packet. Header 601 is limited to a coding not used for ordinary instructions in a manner further detailed below.

Figure 7:
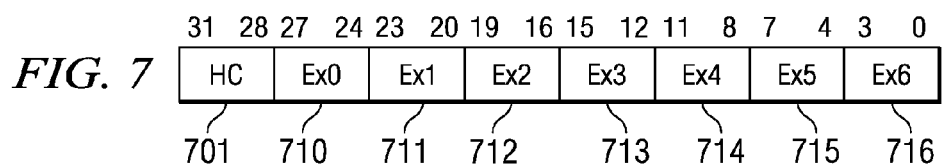
FIG. 7 illustrates a first exemplary coding of the header word of the fetch packet illustrated in FIG. 6.

FIG. 7 illustrates a first example of the coding of header 601 of FIG. 6. This coding is used to extend the opcode of each of the seven instruction words Word0 610, Word1 611, Word2 612, Word3 613, Word4 614, Word5 615 and Word6 616 by four bits. Head code 701 occupies a predetermined location within the header 610. The example of FIG. 7 illustrates this as the most significant bits. Head code 701 must be uniquely identifiable. FIG. 7 illustrates seven extension code fields Ex0 710, Ex1 711, Ex2 712, Ex3 713, Ex4 714, Ex5 715 and Ex6 716. As illustrated in the example of FIG. 7 extension code field Ex0 710 occupies bits 24 to 27, Ex1 711 occupies bits 23 to 20, Ex2 712 occupies bits 19 to 16, Ex3 713 occupies bits 15 to 12, Ex4 714 occupies bits 11 to 8, Ex5 715 occupies bits 7 to 4 and Ex6 716 occupies bits 3 to 0. Each of the seven extension code fields Ex0 710, Ex1 711, Ex2 712, Ex3 713, Ex4 714, Ex5 715 and Ex6 716 correspond to one of the seven instruction words Word0 610, Word1 611, Word2 612, Word3 613, Word4 614, Word5 615 and Word6 616. As will be further described below, each of the seven instruction words Word0 610, Word1 611, Word2 612, Word3 613, Word4 614, Word5 615 and Word6 616 is extended by four bits by the corresponding extension code fields Ex0 710, Ex1 711, Ex2 712, Ex3 713, Ex4 714, Ex5 715 and Ex6 716. This is the equivalent of having 36 bit instructions.

Figure 8:
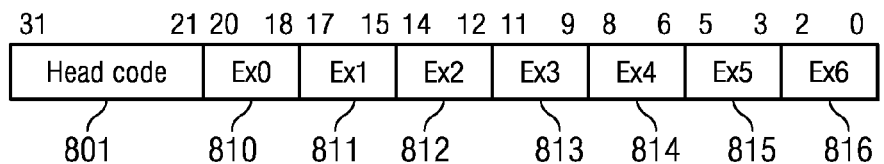
FIG. 8 illustrates a second exemplary coding of the header word of the fetch packet illustrated in FIG. 6.

FIG. 8 illustrates a second example of the coding of header 601 of FIG. 6. This coding is used to extend the opcode of each of the seven instruction words Word0 610, Word1 611, Word2 612, Word3 613, Word4 614, Word5 615 and Word6 616 by three bits. Head code 801 occupies a predetermined location within the header 610. The example of FIG. 8 illustrates this as the most significant bits. Head code 801 must be uniquely identifiable. FIG. 8 illustrates seven extension code fields Ex0 810, Ex1 811, Ex2 812, Ex3 813, Ex4 814, Ex5 815 and Ex6 816. As illustrated in the example of FIG. 8 extension code field Ex0 810 occupies bits 20 to 18, Ex1 811 occupies bits 17 to 15, Ex2 812 occupies bits 14 to 12, Ex3 813 occupies bits 11 to 9, Ex4 814 occupies bits 8 to 6, Ex5 815 occupies bits 5 to 3 and Ex6 816 occupies bits 2 to 0. Each of the seven extension code fields Ex0 810, Ex1 811, Ex2 812, Ex3 813, Ex4 814, Ex5 815 and Ex6 816 correspond to one of the seven instruction words Word0 610, Word1 611, Word2 612, Word3 613, Word4 614, Word5 615 and Word6 616. As will be further described below, each of the seven instruction words Word0 610, Word1 611, Word2 612, Word3 613, Word4 614, Word5 615 and Word6 616 is extended by three bits by the corresponding extension code fields Ex0 710, Ex1 711, Ex2 712, Ex3 713, Ex4 714, Ex5 715 and Ex6 716. This is equivalent of having 35 bit instructions.

Figure 9:
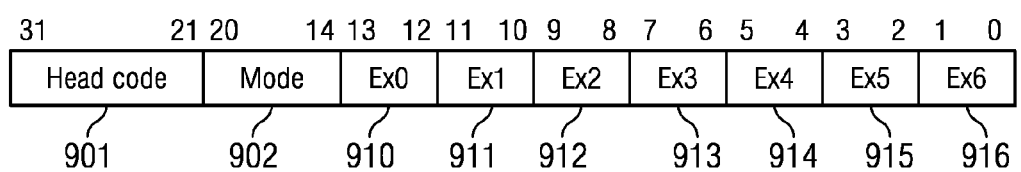
FIG. 9 illustrates a third exemplary coding of the header word of the fetch packet illustrated in FIG. 6.

FIG. 9 illustrates a third example of the coding of header 601 of FIG. 6. This coding is used to extend the opcode of each of the seven instruction words Word0 610, Word1 611, Word2 612, Word3 613, Word4 614, Word5 615 and Word6 616 by two bits. Head code 901 occupies a predetermined location within the header 610. The example of FIG. 9 illustrates this as the most significant bits. Head code 901 must be uniquely identifiable. FIG. 9 illustrates seven extension code fields Ex0 910, Ex1 911, Ex2 912, Ex3 913, Ex4 914, Ex5 915 and Ex6 916. As illustrated in the example of FIG. 9 extension code field Ex0 910 occupies bits 13 to 12, Ex1 911 occupies bits 11 to 10, Ex2 912 occupies bits 9 to 8, Ex3 913 occupies bits 7 to 6, Ex4 914 occupies bits 5 to 4, Ex5 915 occupies bits 3 to 2 and Ex6 916 occupies bits 1 to 0. Each of the seven extension code fields Ex0 910, Ex1 911, Ex2 912, Ex3 913, Ex4 914, Ex5 915 and Ex6 916 correspond to one of the seven instruction words Word0 610, Word1 611, Word2 612, Word3 613, Word4 614, Word5 615 and Word6 616. As will be further described below, each of the seven instruction words Word0 610, Word1 611, Word2 612, Word3 613, Word4 614, Word5 615 and Word6 616 is extended by two bits by the corresponding extension code fields Ex0 910, Ex1 911, Ex2 912, Ex3 913, Ex4 914, Ex5 915 and Ex6 916. This is equivalent of having 34 bit instructions.

FIG. 9 further illustrates the header 601 also includes mode field 902 occupying bits 20 to 14. Each bit of mode field 902 corresponds to one of the seven instruction words Word0 610, Word1 611, Word2 612, Word3 613, Word4 614, Word5 615 and Word6 616. In this example, a "0" in a bit of mode field 902 indicates that the corresponding instruction word is to be decoded normally without addition The of a corresponding extension field. A "1" in a bit of mode field 902 indicates that the corresponding instruction word is to be decoded specially using the two bits of the corresponding extension field. Thus normal and extended instructions can be placed in the same fetch packet and properly decoded with reference to mode field 902.

Figure 10:
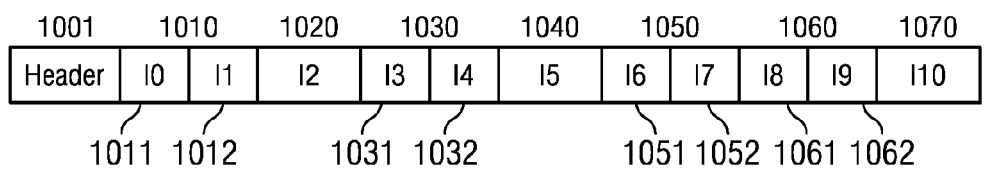
FIG. 10 illustrates an exemplary fetch packet of variable length instructions according to an embodiment of this invention.

FIG. 10 illustrates another example fetch packet according to this invention. The fetch packet of FIG. 10 includes header 1001 and seven instruction slots 1010, 1020, 1030, 1040, 1050, 1060 and 1070. Four of these instruction slots are divided into two instructions each. Instruction slot 1010 includes instructions I0 1011 and I1 1012. Instruction slot 1020 includes instruction I2. Instruction slot 1030 includes instructions I3 1031 and I4 1032. Instruction slot 1040 includes instruction I5. Instruction slot 1050 includes instructions I6 1051 and I7 1052. Instruction slot 1060 includes instructions I8 1061 and I9 1062. Instruction slot 1070 includes instruction I10.

Figure 11:
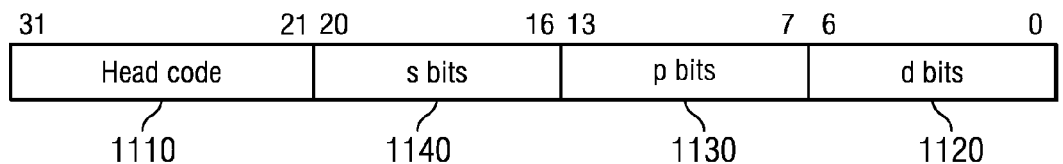
FIG. 11 illustrates an exemplary coding of the header word of the fetch packet illustrated in FIG. 10.

FIG. 11 illustrates header 1001 illustrated in FIG. 10. Header 1001 includes head code 1110, which must permit header 1001 to be uniquely identified. Header 1001 includes d bits field 1120. The d bit field 1120 includes seven bits 6 to 0. Each bit within the d bit field 1120 indicates whether the corresponding instruction slot 1010, 1020, 1030, 1040, 1050 and 1060 is decoded as one normal length instruction or as a pair of half-length instructions. In the preferred embodiment a "0" in corresponding d bit indicates a single normal length instruction, while a "1" indicates a pair of half-length instructions. Thus to encode the instructions illustrated in FIG. 10, d bit field 1120 is "1010110". This technique permits mixing normal length and reduced length instructions in the same fetch packet. This mixing does not require any mode switching overhead as required by the prior art.

Figure 13:
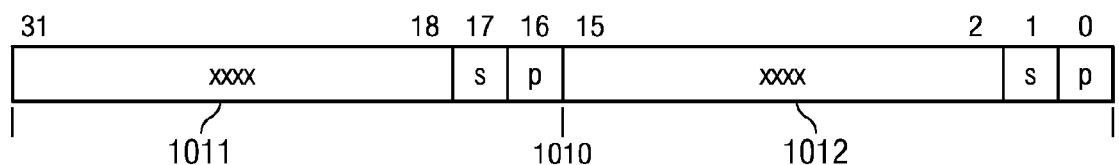
FIG. 13 illustrates an example of two half-length instructions within an instruction slot having p and s bits at predetermined locations.

These half-length instructions must be coded to determine execute packets and the data path to execute the instruction. In one embodiment, half-length instructions also include the p and s bits like normal length instructions as described in conjunction with FIG. 4. These bits are decoded in the same manner as previously described except that the p and s bits of the first instruction in a pair of half-length instructions in an instruction slot are located in a different position within the instruction slot. FIG. 13 illustrates an example of two half-length instructions I0 1011 and I1 1012 within instruction slot 1100 having p and s bits at predetermined locations. In this example half-length instruction I1 1012 has a p bit at bit 0 and an s bit at bit 1. This is the same location within the instruction slot 1010 as the normal length instruction illustrated in FIG. 4. Half-length instruction I0 1011 has a p bit at bit 16 and an s bit at bit 17. This p bit and s bit are at different locations within the instruction slot 1010 than illustrated in FIG. 4 but in the same location relative to half-length instruction I0 1011 and the corresponding p and s bits in half-length instruction I1 1012. In the preferred embodiment normal length instructions are 32 bits and half-length instructions are 16 bits. Including p bits and s bits within these instructions reduces the number of bits available for operand selection and instruction encoding. FIG. 11 illustrates an alternative embodiment that removes these bits from half-length instructions. FIG. 11 illustrates p bits field 1130 and s bits field 1140. The p bits field 1130 includes seven bits 13 to 7. Each bit corresponds to one of instruction slots 1010 to 1060. If the corresponding bit within d bit field 1120 indicates half-length instructions, then a corresponding bit within p bit field 1130 indicates the execute packet for the pair of instructions within the instruction slot. Similarly, s bit field 1140 includes seven bits 20 to 14. If the corresponding bit within d bit field 1120 indicates half-length instructions, then a corresponding bit within bit field 1140 indicates the data path for the pair of instructions within the instruction slot. This alternative coding requires that the two half-length instructions within a single instruction slot be included in the same fetch packet and execute in the same data path. Thus this alternative trades compiler scheduling flexibility for opcode bits.

FIG. 12 illustrates part of digital signal processor integrated circuit 200 of FIG. 2 showing how the instructions of this invention can be decoded. A fetch packet of 8 consecutive instructions comes from program fetch unit 10. Two consecutive fetch packets are stored in corresponding instruction buffers 1210, 1211, 1212, 1213, 1214, 1215, 1216 and 1217 for one fetch packet and corresponding instruction buffers 1230, 1231, 1232, 1233, 1234, 1235, 1236 and 1237 for the other fetch packet. According to this example, the header must be in the first instruction slot and thus will always be stored in instruction buffer 1210 or in instruction buffer 1230 if present. Decoder 1220 compares the instruction stored in instruction buffer 1210 to detect a unique head code within this instruction buffer. If decoder 1220 detects a unique head code marking the instruction, then it generates signals on lines 1221 and 1223 to switch 1250. The signal on lines 1221 are control signals. These may correspond to bits within mode field 902 indicating normal or special decoding of a corresponding instruction. These may correspond to the normal length/half-length indicator of d bit field 1120. These two types of information will be handled differently as will be explained below in conjunction with the description of switch 1230. The signals on lines 1223 are the extension bits Ex0, Ex1, Ex2, Ex3, Ex4, Ex5 and Ex6 as illustrated in FIGS. 7 to 9. Decoder 1240 operates similarly in relation to any header stored in instruction buffer 1230. If decoder 1240 detects a header, then it generates control signals on lines 1241 and data signals on 1243 to switch 1250.

Switch 1250 handles the transmission of instructions to the function units .L1 22, .S1 23, .M1 24, .D1 25, .L2 32, .S2 33, .M2 34 and .D2 35 for execution. Switch 1250 directs instructions from one or more of instruction buffers 1210, 1211, 1212, 1213, 1214, 1215, 1216, 1217, 1230, 1231, 1232, 1233, 1234, 1235, 1236 or 1237 to the appropriate decode units 1260, 1261, 1262, 1263, 1264, 1265, 1266 and 1267. Switch 1250 is responsive to the p bits of the instructions stored in instruction buffers 1210, 1211, 1212, 1213, 1214, 1215, 1216, 1217, 1217, 1230, 1231, 1232, 1233, 1234, 1235, 1236 and 1237 to dispatch only instructions within the same execute packet. Note that the p bit coding enables an execute packet to cross the boundary between two fetch packets. This is coded by the last instruction within the fetch packet having a p bit set to "1" indicating the next instruction is executed in parallel with that instruction. Providing instruction buffers for two consecutive fetch packets as illustrated in FIG. 12 enables switch 1250 to simultaneously dispatch such execute packets. Switch 1250 is also responsive to the s bits of these instructions to dispatch instructions to the indicated data path 20 or 30. Lastly, switch 1250 must partially decode the opcodes of the selected instructions to determine if an instruction is to be dispatched to an L unit, an S unit, an M unit or a D unit. In the preferred embodiment the compiler determines which functional unit executes which instruction. All this information is included in the instruction coding. Central processing unit 1 has no hardware option but merely follows the direction of the compiler as coded in the instructions. This operation is not shown in detail as it is practiced by the prior art TMS320C6400 digital signal processor. This aspect of switch 1250 operates according to the known art.

Switch 1250 operates differently than the prior art in accordance with this invention. When decoder 1220 or 1240 detects a header indicating use of this invention it signals switch 1230. Decoder 1220 supplies control signals on lines 1221 and extended opcode bits on lines 1223 to switch 1250. If decoder 1220 detects one of one or more headers indicating one of the fetch packets of this invention, decoder 1220 includes this information in control bits on lines 1221. Decoder 1240 similarly supplies control signals on lines 1241 and extended opcode bits on lines 1243 to switch 1250. Switch 1250 is responsive to these signals. If a header detected by decoder 1220 or decoder 1240 is one that indicates extension opcode bits, the decoder supplies these extended opcode bits to switch 1250. Switch 1250 operates to supply these extended opcode bits to the decoder 1260, 1261, 1262, 1263, 1264, 1265, 1266 or 1267 otherwise indicated by the coding of the instruction fetch packet. Depending on the instruction coding such extension opcode bits in a single execute packet can come from one or two fetch packets. In the event that the coding of FIG. 9 is detected by decoder 1220 or 1240, the decoder supplies bits on control lines 1221 or 1241 corresponding to mode field 902 to switch 1250. Switch 1250 is responsible to signal the appropriate decoder 1260, 1261, 1262, 1263, 1264, 1265, 1266 or 1266 of the normal or extended status indicated by the corresponding bit of mode field 902. Decoders 1260, 1261, 1262, 1263, 1264, 1265, 1266 and 1266 must be altered to be able to decode the extended instructions and make appropriate control of functional units 22, 23, 24, 25, 32, 33, 34 and 35.

Switch 1250 operates differently if decoder 1220 or decoder 1240 detects the instruction packet of FIG. 10. The decoder supplies bit fields D0 1130, D1 1131, D2 1132, D3 1133, D4 1134, D5 1135 and D6 1136 to switch 1250. Switch 1250 employs these bit fields with the p and s bits to supply appropriate normal length or half-length instructions to the decode units 1260, 1261, 1262, 1263, 1264, 1265, 1266 and 1267. These p and s bits may be included within the half-length instructions or included within the p bits field 1130 and the s bits field 1140 as described above. Switch 1250 uses these signals in conjunction with the modified opcodes of half-length instructions in the same manner that switch 1250 handles normal length instructions. That is, the compiler completely specifies the mapping of both normal length and half-length instructions from the fetch packet to a selected one of the functional units. Each of the decode units 1260, 1261, 1262, 1263, 1264, 1265, 1266 and 1267 to which half-length instructions can be dispatched must be altered to be capable of decoding the modified coding of these half-length instruction. Note that not all of the functional unit types L, S, M and D need be capable of operating in conjunction of half-length instructions for this invention to be used. Further, no execute packet can include more instructions in any combination of normal length and half-length exceeding the number of functional units.

The special fetch packet header of this invention signals the hardware to interpret an instruction word normally or differently. In one embodiment the header bits signal that there are additional bits in the header that can be used to extend the opcode space and therefore extend the instruction set. As described above, in a 32-bit header each of the other 7 instructions in a fetch packet can have their instruction extended by a number of bits taken from predetermined locations in the header. This enabled extended bit instructions such as greater than 32-bits or additional 32-bit instructions can be added to an instruction set. This can be achieved even when there is very little opcode space remaining at the cost of only a minor increase in code size. This increase in code space is one instruction per fetch packet where a special instruction is needed. This invention introduces no latency penalty and does not involve switching modes.

In another embodiment, the header bits signal what bits in the fetch packet should be interpreted as 16-bit instructions and what bits should be interpreted as 32-bit instructions. A 16-bit instruction space can be created that is a subset of a 32-bit instruction set. These 16-bit instructions can be used in pairs. The header tells where the 16-bit instructions are located and where the 32-bit instructions are located. In the preferred embodiment, 32-bit instructions cannot span 32-bit boundaries. Thus only 7 bits in the header can indicate what words in the fetch packet are 32-bit instructions and what words in the fetch packet are pairs of 16-bit instructions. The 16-bit instructions such as instructions I0 1011, I1 1012, I3 1031, I4 1032, I6 1051, I7 1052, I8 1061 and I9 1062 illustrated in FIG. 10 can have p and s that are decoded in the manner described above to determine the execute packets and the data path for each such instruction. Alternatively the additional bits in field 1120 of FIG. 11 can be used in place of p and s bits to indicate what instructions execute in parallel which data path is encoded. The modeless instruction set of this invention and selecting a 16-bit instruction set that is a subset of a 32-bit instruction set, enables the compiler to delay instruction size selection until after the traditional compiler phases of instruction selection, register allocation and instruction scheduling. Eliminating the limitations of instruction modes allows a compiler greater freedom in instruction selection and allows the compiler/code generation tools to use 32-bit instructions when necessary and use 16-bit instructions when possible. The 16-bit instructions can be used at a finer granularity than normally used in architectures with modes.

What is claimed is:

1. A method of operating a programmable data processor that fetches instructions in predetermined fetch packets of plural instructions slots comprising the steps of:
    optionally substituting a header word for an instruction in a predetermined instruction slot within a fetch packet, said header word including a unique identifier different from all normal instructions;
    detecting whether the unique identifier is within the predetermined instruction slot of a fetch packet;
    upon not detecting the unique identifier is within the predetermined instruction slot of a fetch packet, decoding instructions in instruction slots within the fetch packet including said predetermined instruction slot in a first manner; and
    upon detecting the unique identifier is within the predetermined instruction slot of a fetch packet, decoding instructions in other instruction slots than said predetermined instruction slot within the fetch packet in a second manner different from the first manner.

2. The method of claim 1, wherein:
    said step of optionally substituting a header word for a predetermined instruction within a fetch packet includes providing an extension opcode field within said header word corresponding to each instruction slot other than said predetermined instruction slot within the fetch packet;
    said method further comprising the step of supplying each extension opcode field to a decoder together with an instruction in said corresponding instruction slot; and
    said step of decoding instructions in other instruction slots than said predetermined instruction slot within the fetch packet in a second manner includes decoding said corresponding extension opcode field in conjunction with decoding each instruction permitting decoding instructions with more bits than included within an instruction slot.

3. The method of claim 1, wherein:
    said step of optionally substituting a header word for a predetermined instruction within a fetch packet includes providing a mode bit within said header word corresponding to each instruction slot other than said predetermined instruction slot within the fetch packet; and
    said step of decoding instructions in other instruction slots than said predetermined instruction slot within the fetch packet in a second manner includes decoding each instruction in said first manner if said corresponding mode bit has a first digital state and decoding each instruction in said second manner if said corresponding mode bit has a second digital state opposite said first digital state.

4. The method of claim 1, wherein:
    said step of optionally substituting a header word for a predetermined instruction within a fetch packet includes providing a length bit within said header word corresponding to each instruction slot other than said predetermined instruction slot within the fetch packet; and
    said step of decoding instructions in other instruction slots than said predetermined instruction slot within the fetch packet in a second manner includes decoding each instruction slot as a single normal length instruction filling said instruction slot if said corresponding length bit has a first digital state and decoding each instruction slot as two reduced length instructions within said instruction slot if said corresponding length bit has a second digital state opposite said first digital state.

5. The method of claim 4, further comprising the steps of:
    detecting data indicating instructions that can execute simultaneously in parallel as an execute packet including
        detecting a p bit at a predetermined location within an instruction slot having a corresponding length bit in the first digital state, and detecting a corresponding p bit within said header word for each instruction within an instruction slot having a corresponding length bit in the second digital state; and simultaneously dispatching each instruction in an execute packet to a corresponding functional unit for execution including dispatching any instruction in a next following instruction slot in a same execute packet with all instructions in an instruction slot if the p bit corresponding to that instruction slot has a first digital state, and dispatching any instruction in a next following instruction slot in a next execute packet following all instructions in an instruction slot if the p bit corresponding to that instruction slot has a second digital state opposite to the first digital state.

6. The method of claim 1, wherein:

said step of optionally substituting a header word for a predetermined instruction within a fetch packet includes providing an extension opcode field within said header word corresponding to each instruction slot other than said predetermined instruction slot within the fetch packet, providing a mode bit within said header word corresponding to each instruction slot other than said predetermined instruction slot within the fetch packet;

said method further comprising the step of supplying each extension opcode field to a decoder together with an instruction in said corresponding instruction slot;

said step of decoding instructions in other instruction slots than said predetermined instruction slot within the fetch packet in a second manner includes decoding said corresponding extension opcode field in conjunction with decoding each instruction permitting decoding instructions with more bits than included within an instruction slot, decoding each instruction in said first manner if said corresponding mode bit has a first digital state and decoding each instruction in said second manner if said corresponding mode bit has a second digital state opposite said first digital state.

7. A programmable data processor comprising:

a program fetch unit operable to fetch instructions from a memory in predetermined fetch packets of plural instructions slots;

a plurality of instruction buffers, each operable to store an instruction of one of said plural instruction slots;

a header decoder connected to a predetermined one of said plurality of instruction buffers operable to detect whether a header word in a predetermined instruction slot includes a unique identifier different from all normal instructions;

a plurality of instruction decoders operable to decode instructions;

a plurality of functional units, each connected to a corresponding one of said plurality of instruction decoders and operable to execute a data processor operation corresponding to a decoded instruction; and a switch connected to said plurality of instruction buffers, said header decoder and said plurality of instruction decoders, said switch operable to dispatch an instruction from at least one instruction buffer to a corresponding instruction decoder, signal each instruction decoder to decode instructions in instruction slots within a fetch packet including said predetermined instruction slot in a first manner when said header decoder does not detect said header word includes said unique identifier different from all normal instructions, and signal each instruction decoder to decode instructions in other instruction slots than said predetermined instruction slot within the fetch packet in a second manner different from the first manner when said header decoder detects said header word includes said unique identifier different from all normal instructions.

8. The programmable data processor of claim 7, wherein:

said header decoder upon detection of said unique identifier is further operable to detect an extension opcode field within said header word corresponding to each instruction slot other than said predetermined instruction slot within the fetch packet and supply said extension opcode fields to said switch; and said switch is further operable to dispatch each extension opcode field to a corresponding instruction decoder; and each of said plurality of instruction decoders is further operable to decode instructions in the second manner including decoding said corresponding extension opcode field in conjunction with decoding each instruction permitting decoding instructions with more bits than included within an instruction buffer.

9. The programmable data processor of claim 7, wherein:

said header decoder upon detection of said unique identifier is further operable to detect a mode bit within said header word corresponding to each instruction slot other than said predetermined instruction slot within the fetch packet; and said switch is further operable to signal each instruction decoder to decode instructions within the fetch packet in said first manner when said corresponding mode bit has a first digital state, and signal each instruction decoder to decode instructions in other instruction slots than said predetermined instruction slot within the fetch packet in said second manner when said corresponding mode bit has a second digital state opposite said first digital state.

10. The programmable data processor of claim 7, wherein:

said header decoder upon detection of said unique identifier is further operable to detect a length bit within said header word corresponding to each instruction slot other than said predetermined instruction slot within the fetch packet; and said switch is further operable to dispatch all bits within an instruction buffer to a corresponding instruction decoder when said corresponding length bit has a first digital state, and dispatch a first half of bits within an instruction buffer to a first corresponding instruction decoder and dispatch a second half of bits within said instruction buffer to a second corresponding instruction decoder different from said first corresponding instruction decoder when said corresponding length bit has a second digital state opposite said first digital state.

11. The programmable data processor of claim 10, wherein:

said header decoder is further operable to detect a p bit at a predetermined location within said predetermined one of said plurality of instruction buffers corresponding to one of said instruction buffers other than said predetermined one of said plurality of instruction buffers having a corresponding length bit in said first digital state, and supply said p bit to said switch; and said switch is further operable to
dispatch any instruction in a next following instruction buffer in a same execute packet with all instructions in an instruction buffer if the p bit corresponding to that instruction buffer has a first digital state, and
dispatch any instruction in a next following instruction buffer in a next execute packet following all instructions in an instruction buffer if the p bit corresponding to that instruction buffer has a second digital state opposite to the first digital state.

12. The programmable data processor of claim 7, wherein:
said header decoder upon detection of said unique identifier is further operable to
detect an extension opcode field within said header word corresponding to each instruction slot other than said predetermined instruction slot within the fetch packet and supply said extension opcode fields to said switch, and
detect a mode bit within said header word corresponding to each instruction slot other than said predetermined instruction slot within the fetch packet;
said switch is further operable to
dispatch each extension opcode field to a corresponding instruction decoder,
signal each instruction decoder to decode instructions within the fetch packet in said first manner when said corresponding mode bit has a first digital state, and
signal each instruction decoder to decode instructions in other instruction slots than said predetermined instruction slot within the fetch packet in said second manner when said corresponding mode bit has a second digital state opposite said first digital state; and
each of plurality of said instruction decoders is further operable to decode instructions in the second manner including decoding said corresponding extension opcode field in conjunction with decoding each instruction permitting decoding instructions with more bits than included within an instruction buffer.

13. A method of operating a programmable data processor that fetches instructions in predetermined fetch packets of a predetermined number of plural instructions slots comprising the steps of:
coding instructions by
optionally selecting either a normal packet mode or an alternative packet mode for each fetch packet;
upon selection of the normal packet mode, coding a normal mode instruction in each instruction slot of the fetch packet; and
upon selection of the alternative packet mode
coding a header word in a predetermined instruction slot within the fetch packet, said header word including a unique identifier different from all normal mode instructions and including at least one bit indicating an alternative instruction mode for at least one corresponding instruction slot in the fetch packet,
coding an alternative mode instruction in each instruction slot where the header word indicates the alternative instruction mode, and
coding a normal mode instruction for any instruction slot where the header word does not indicate the alternative instruction mode; and
controlling operation of the programmable data processor using the coded instructions.

14. The method of claim 13, wherein:
said at least one bit indicating the alternative instruction mode of the header word includes an extension opcode field within said header word corresponding to each instruction slot within the fetch packet other than the predetermined instruction slot; and
said step of coding an alternative mode instruction includes coding an alternative mode instruction for each instruction slot within the fetch packet other than the predetermined instruction slot including a corresponding extension opcode field within the header word, whereby each such alternative mode instruction includes more opcode bits than included within an instruction slot.

15. The method of claim 13, wherein:
said at least one bit indicating the alternative instruction mode of the header word includes a length bit corresponding to each instruction slot within the fetch packet other than said predetermined instruction slot;
said step of coding a normal mode instruction for any instruction slot within a fetch packet selected for the alternative packet mode where the header word does not indicate alternative instruction mode codes a normal mode instruction in an instruction slot if said corresponding length bit has a first digital state; and
said step of coding an alternative mode instruction codes two reduced length instructions within said instruction slot if said corresponding length bit has a second digital state opposite said first digital state.

16. The method of claim 13, wherein:
said at least one bit indicating the alternative instruction mode of the header word includes
a mode bit corresponding to each instruction slot within the fetch packet other than said predetermined instruction slot, and
an extension opcode field within said header word corresponding to each instruction slot within the fetch packet other than the predetermined instruction slot;
said step of coding a normal mode instruction for any instruction slot within a fetch packet selected for the alternative packet mode codes a normal mode instruction in an instruction slot if said corresponding mode bit has a first digital state; and
said step of coding an alternative mode instruction codes an alternative mode instruction for each instruction slot within the fetch packet other than the predetermined instruction slot including a corresponding extension opcode field within the header word if said corresponding mode bit has a second digital state opposite said first digital state, whereby each such alternative mode instruction includes more opcode bits than included within an instruction slot.

17. The method of claim 13, wherein:
said at least one bit indicating the alternative instruction mode of the header word includes a length bit corresponding to each instruction slot within the fetch packet other than said predetermined instruction slot;
the method further comprising the step of determining which normal mode instructions and alternative mode instructions can execute simultaneously in parallel as an execute packet;
said step of coding a normal mode instruction for any instruction slot within a fetch packet selected for the normal packet mode indicates the normal packet mode codes a normal mode instruction including a p bit at a predetermined location within the instruction slot having a first digital state if the normal mode instruction can execute simultaneously in parallel with an instruction in a next instruction slot and having a second digital state opposite to said first digital state if the normal mode instruction cannot execute simultaneously in parallel with a next instruction;

said step of coding a normal mode instruction for any instruction slot within a fetch packet selected for the alternative packet mode and the corresponding length bit has a third digital state codes a normal mode instruction including a p bit at a predetermined location within the instruction slot having a first digital state if the normal mode instruction can execute simultaneously in parallel with an instruction in the next instruction slot and having a second digital state opposite to said first digital state if the normal mode instruction cannot execute simultaneously in parallel with a next instruction; and said step of coding an alternative mode instruction codes two reduced length instructions within said instruction slot if said corresponding length bit has a fourth digital state opposite said third digital state, each reduced length instruction having a p bit at a predetermined location within the instruction slot having a first digital state if the reduced length instruction can execute simultaneously in parallel with an instruction in the next instruction slot and having a second digital state opposite to said first digital state if the reduced length instruction cannot execute simultaneously in parallel with an instruction in the next instruction slot.

18. The method of claim 13, wherein:

said at least one bit indicating the alternative instruction mode of the header word includes
- a length bit corresponding to each instruction slot within the fetch packet other than said predetermined instruction slot, and
- a p bit corresponding to each instruction slot within the fetch packet other than said predetermined instruction slot;

the method further comprising the step of determining which normal mode instructions and alternative mode instructions can execute simultaneously in parallel as an execute packet;

said step of coding a normal mode instruction for any instruction slot within a fetch packet selected for the normal packet mode codes a normal mode instruction including a p bit at a predetermined location within the instruction slot having a first digital state if the normal mode instruction can execute simultaneously in parallel with an instruction in a next instruction slot and having a second digital state opposite to said first digital state if the normal mode instruction cannot execute simultaneously in parallel with a next instruction;

said step of coding a normal mode instruction for any instruction slot within a fetch packet selected for the alternative packet mode and the corresponding length bit has a third digital state codes a normal mode instruction including a p bit at a predetermined location within the instruction slot having a first digital state if the normal mode instruction can execute simultaneously in parallel with an instruction in the next instruction slot and having a second digital state opposite to said first digital state if the normal mode instruction cannot execute simultaneously in parallel with a next instruction; and said step of coding an alternative mode instruction codes two reduced length instructions within said instruction slot if said corresponding length bit has a fourth digital state opposite said third digital state, the p bit for said corresponding instruction slot in the header word having the first digital state if the two reduced length instructions can execute simultaneously in parallel with a next instruction and having the second digital state opposite to said first digital state if the two reduced length instructions cannot execute simultaneously in parallel with a next instruction.

19. A method of operating a programmable data processor that fetches instructions in predetermined fetch packets of a predetermined number of plural instructions slots comprising the steps of:

optionally selecting either a normal packet mode or an alternative packet mode for each fetch packet;

upon selection of the normal packet mode, coding a normal mode instruction in each instruction slot of the fetch packet;

upon selection of the alternative packet mode
- coding a header word in a predetermined instruction slot within the fetch packet, said header word including a unique identifier different from all normal mode instructions and including at least one bit indicating an alternative instruction mode for at least one corresponding instruction slot in the fetch packet,
- coding an alternative mode instruction in each instruction slot where the header word indicates alternative instruction mode, and
- coding a normal mode instruction for any instruction slot where the header word does not indicate an alternative packet mode;

upon decoding a fetch packet detecting whether the unique identifier of a header word is included within the predetermined instruction slot of a fetch packet;

upon not detecting the unique identifier included within the predetermined instruction slot of a fetch packet, decoding instructions in instruction slots within the fetch packet including said predetermined instruction slot in a normal mode; and upon detecting the unique identifier included within the predetermined instruction slot of a fetch packet,
- decoding instructions in the alternative packet mode for each instruction slot where the header word indicates the alternative packet mode, and
- decoding instructions in a normal mode instruction for each instruction slot where the header word does not indicate the alternative packet mode.

20. The method of claim 19, wherein:

said at least one bit indicating alternative packet mode of the header word includes an extension opcode field within said header word corresponding to each instruction slot within the fetch packet other than the predetermined instruction slot;

said step of coding an alternative packet mode instruction includes coding an alternative packet mode instruction for each instruction slot within the fetch packet other than the predetermined instruction slot including a corresponding extension opcode field within the header word, whereby each such alternative packet mode instruction includes more opcode bits than included within an instruction slot;

the method further comprising the step of upon decoding a fetch packet, supplying each extension opcode field to a decoder together with an instruction in said corresponding instruction slot; and said step of decoding instructions in the alternative packet mode includes decoding said corresponding extension opcode field in conjunction with decoding the instruction.

21. The method of claim 19, wherein:

said at least one bit indicating the alternative instruction mode of the header word includes a length bit corresponding to each instruction slot within the fetch packet other than said predetermined instruction slot;

said step of coding a normal mode instruction for any instruction slot within a fetch packet selected for the alternative packet mode codes a normal mode instruction in an instruction slot if said corresponding length bit has a first digital state;

said step of coding an alternative mode instruction codes two reduced length instructions within said instruction slot if said corresponding length bit has a second digital state different from said first digital state;

said step of decoding instructions in a normal mode for each instruction slot within a fetch packet selected for the alternative packet mode decodes each instruction slot as a single normal length instruction filling said instruction slot if said corresponding length bit has a first digital state; and said step of decoding instructions in the alternative mode decodes each instruction slot as two reduced length instructions within said instruction slot if said corresponding length bit has said second digital state.

22. The method of claim 19, wherein:

said at least one bit indicating alternative instruction mode of the header word includes
  a mode bit corresponding to each instruction slot within the fetch packet other than said predetermined instruction slot, and
  an extension opcode field within said header word corresponding to each instruction slot within the fetch packet other than the predetermined instruction slot;

said step of coding a normal mode instruction for any instruction slot within a fetch packet selected for the alternative packet mode codes a normal mode instruction in an instruction slot if said corresponding mode bit has a first digital state;

said step of coding an alternative mode instruction codes an alternative mode instruction for each instruction slot within the fetch packet other than the predetermined instruction slot including a extension opcode field within the header word corresponding to each instruction slot within the fetch packet other than the predetermined instruction slot if said corresponding mode bit has a second digital state opposite said first digital state, whereby each such alternative mode instruction includes more opcode bits than included within an instruction slot;

the method further comprising the step of upon decoding a fetch packet, supplying each extension opcode field to a decoder together with an instruction in said corresponding instruction slot;

said step of decoding instructions in a normal mode for each instruction slot within a fetch packet selected for the alternative packet mode decodes each instruction slot as a normal mode instruction if said corresponding mode bit has a first digital state; and said step of decoding instructions in the alternative mode decodes said corresponding extension opcode field in conjunction with the instruction if said corresponding mode bit has a second digital state opposite to the first digital state.

23. The method of claim 19, wherein:

said at least one bit indicating the alternative instruction mode of the header word includes a length bit corresponding to each instruction slot within the fetch packet other than said predetermined instruction slot;

the method further comprising the step of determining which normal mode instructions and alternative mode instructions can execute simultaneously in parallel as an execute packet;

said step of coding a normal mode instruction for any instruction slot within a fetch packet selected for the normal packet mode codes a normal mode instruction including a p bit at a predetermined location within the instruction slot having a first digital state if the normal mode instruction can execute simultaneously in parallel with an instruction in a next instruction slot and having a second digital state opposite to said first digital state if the normal mode instruction cannot execute simultaneously in parallel with a next instruction;

said step of coding a normal mode instruction for any instruction slot within a fetch packet selected for the alternative packet mode and the corresponding length bit has a third digital state includes a p bit at a predetermined location within the instruction slot having the first digital state if the normal mode instruction can execute simultaneously in parallel with an instruction in the next instruction slot and having the second digital state if the normal mode instruction cannot execute simultaneously in parallel with a next instruction;

said step of coding an alternative mode instruction codes two reduced length instructions within said instruction slot if said corresponding length bit has a fourth digital state opposite said third digital state, each reduced length instruction having a p bit at a predetermined location within the instruction slot having the first digital state if the reduced length instruction can execute simultaneously in parallel with an instruction in the next instruction slot and having the second digital state if the reduced length instruction cannot execute simultaneously in parallel with an instruction in the next instruction slot;

the method further comprises the step of dispatching an instruction in an execute packet to a corresponding functional unit including
  dispatching any instruction in a next instruction slot simultaneously in a same execute packet with a normal mode instruction in a current instruction slot if the p bit of a current normal mode instruction has the first digital state, and
  dispatching any instruction in a next instruction slot in a next execute packet following a normal mode instruction in a current instruction slot if the p bit of the current normal mode instruction has the second digital state,
  dispatching any instruction in a next instruction slot simultaneously in the same execute packet with an alternative mode instruction in the current instruction slot if the p bit of a current alternative mode instruction has the first digital state, and
  dispatching any instruction in a next instruction slot in a next execute packet following an alternative mode instruction if the p bit of the current alternative mode instruction has the second digital state.

24. The method of claim 19, wherein:

said at least one bit indicating alternative instruction mode of the header word includes
  a length bit corresponding to each instruction slot within the fetch packet other than said predetermined instruction slot, and
  a p bit corresponding to each instruction slot within the fetch packet other than said predetermined instruction slot;

the method further comprising the step of determining which normal mode instructions and alternative mode instructions can execute simultaneously in parallel as an execute packet;

said step of coding a normal mode instruction for any instruction slot within a fetch packet selected for the normal packet mode codes a normal instruction including a p bit at a predetermined location within the instruction slot having a first digital state if the normal mode instruction can execute simultaneously in parallel with an instruction in a next instruction slot and having a second digital state opposite to said first digital state if the normal mode instruction cannot execute simultaneously in parallel with an instruction in the next instruction slot;

said step of coding a normal mode instruction for any instruction slot within a fetch packet selected for the alternative packet mode and the corresponding length bit has a third digital state codes a normal mode instruction including a p bit at a predetermined location within the instruction slot having a first digital state if the normal mode instruction can execute simultaneously in parallel with an instruction in the next instruction slot and having a second digital state opposite to said first digital state if the normal mode instruction cannot execute simultaneously in parallel with an instruction in the next instruction slot; and said step of coding an alternative mode instruction codes two reduced length instructions within said instruction slot if said corresponding length bit has a fourth digital state opposite said third digital state, the p bit for said instruction slot having a first digital state if the two reduced length instructions can execute simultaneously in parallel with an instruction in the next instruction slot and having a second digital state opposite to said first digital state if the two reduced length instructions cannot execute simultaneously in parallel with an instruction in the next instruction slot;

the method further comprises the step of dispatching an instruction in an execute packet to a corresponding functional unit including dispatching any instruction in a next instruction slot simultaneously in a same execute packet with a normal mode instruction in a current instruction slot if the p bit of the current normal mode instruction has the first digital state, and dispatching any instruction in a next instruction slot in a next execute packet following a normal mode instruction in a current instruction slot if the p bit of a current normal mode instruction has the second digital state, dispatching any instruction in a next instruction slot simultaneously in the same execute packet with an alternative mode instruction in the current instruction slot if the p bit of the header word corresponding to the current instruction slot has the first digital state, and dispatching any instruction in a next instruction slot in a next execute packet following an alternative mode instruction if the p bit of the header word corresponding to the current instruction slot has the second digital state.

* * * * *